United States Patent
Zhou

[11] Patent Number: 6,159,573
[45] Date of Patent: Dec. 12, 2000

[54] REWRITABLE OPTICAL INFORMATION MEDIUM

[75] Inventor: Guo-Fu Zhou, Eindhoven, Netherlands

[73] Assignee: U.S. Philips Corporation, New York, N.Y.

[21] Appl. No.: 09/332,238

[22] Filed: Jun. 14, 1999

[30] Foreign Application Priority Data

Jun. 18, 1998 [EP] European Pat. Off. .............. 98202036

[51] Int. Cl.[7] ...................................................... B32B 3/02
[52] U.S. Cl. ...................... 428/64.1; 428/64.4; 428/64.5; 428/64.6; 428/457; 428/913; 430/270.13; 430/495.1; 430/945; 369/283; 369/288
[58] Field of Search .................................. 428/64.1, 64.2, 428/64.4, 64.5, 64.6, 457, 913; 430/270.13, 495.1, 945; 369/283, 288

[56] References Cited

U.S. PATENT DOCUMENTS

| | | | |
|---|---|---|---|
| 5,652,036 | 7/1997 | Kobayashi | 428/64.1 |
| 5,719,006 | 2/1998 | Ohkubo | 430/270.13 |
| 5,876,822 | 3/1999 | Zhou et al. | 428/64.1 |
| 5,935,672 | 7/2000 | Zhou | 428/64.1 |
| 5,965,229 | 10/1999 | Zhou | 428/64.1 |
| 6,040,066 | 3/2000 | Zhou | 428/64.1 |
| 6,087,067 | 7/2000 | Kato | 430/270.13 |

FOREIGN PATENT DOCUMENTS

WO9750084  12/1997  WIPO .............................. G11B 7/24

Primary Examiner—Elizabeth Evans
Attorney, Agent, or Firm—Norman N. Spain

[57] ABSTRACT

A description is given of a rewritable optical information medium having an IPIAIM stack comprising a phase-change recording layer sandwiched between two dielectric layers, a light-absorbing layer of a material like Si, Ge, Mo, or W, a third dielectric layer, and a metal mirror layer. The light-absorbing layer reduces the difference in light absorption between the amorphous state and the crystalline state to a minimum, thus reducing the recording mark distortion. The presence of the light-absorbing layer in this position ensures that the optical phase difference between the amorphous and the crystalline state is almost zero, making the medium suitable for land-groove recording.

10 Claims, 1 Drawing Sheet

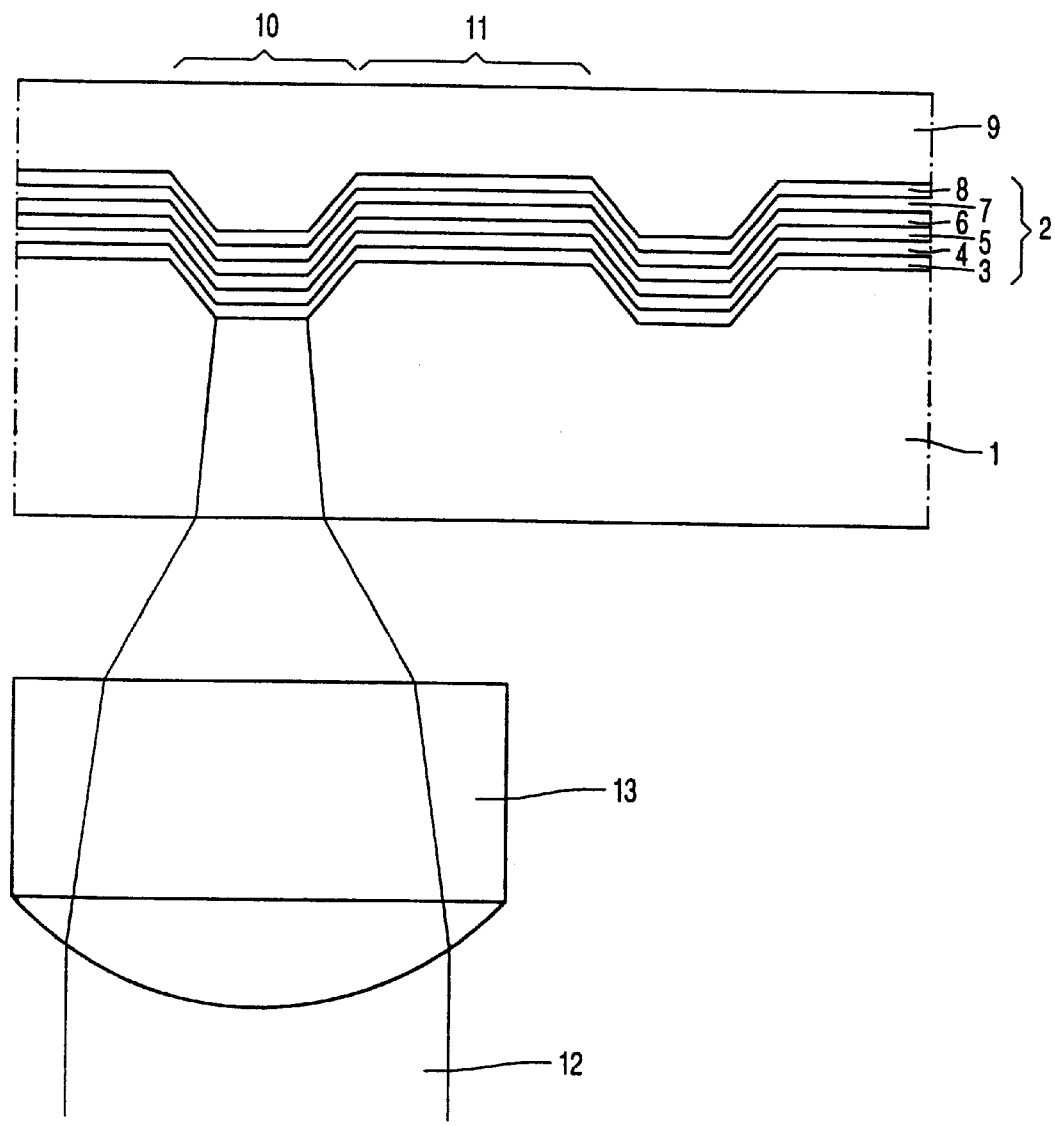

REWRITABLE OPTICAL INFORMATION MEDIUM

BACKGROUND OF THE INVENTION

The invention relates to an optical information medium for rewritable recording by means of a laser-light beam, said medium comprising a substrate carrying a stack of layers, which stack comprises a first, a second and a third dielectric layer, a recording layer of a phase-change material arranged between two dielectric layers, the phase-change material being able to record amorphous marks when in the crystalline state, a light-absorptive layer, and a metal mirror layer.

The invention also relates to the use of such an optical recording medium for land-groove recording.

Optical information or data storage based on the phase-change principle is attractive, because it combines the possibilities of direct overwrite (DOW) and high storage density with easy compatibility with read-only systems. Phase-change optical recording involves the formation of submicrometer-sized amorphous recording marks in a thin crystalline film using a focused laser-light beam. During recording information, the medium is moved with respect to the focused laser-light beam which is modulated in accordance with the information to be recorded. Due to this, quenching takes place in the phase-change recording layer and causes the formation of amorphous information bits in the exposed areas of the recording layer which remains crystalline in the unexposed areas. Erasure of written amorphous marks is realized by recrystallizing through heating with the same laser. The amorphous marks represent the data bits, which can be reproduced via the substrate by a low-power focused laser-light beam. Reflection differences of the amorphous marks with respect to the crystalline recording layer bring about a modulated laser-light beam which is subsequently converted by a detector into a modulated photocurrent in accordance with the coded, recorded digital information.

One of the goals in phase-change optical recording is to obtain a high storage capacity for applications like DVD-RAM, DVD-Rewritable and DVR (Digital Video Recorder), so that such media are suitable for high density recording, e.g. a storage capacity of over 3 Gbyte at a disc diameter of 120 mm. For this purpose, possible options are reducing the laser wavelength $\lambda$ and/or increasing the numerical aperture (NA), because the laser spot size is proportional to $(\lambda/NA)^2$. An alternative option is the application of multiple recording layers. Another possibility would be to record information tracks both in the grooves and on the lands between the tracking guide grooves of the medium (land-groove recording). These grooves are present to guide the laser-light beam along a track.

The storage density of a phase-change optical information medium is determined by both the radial density and the tangential density of the marks. The radial density is determined by the track pitch, i.e. the distance between adjacent track centerlines of the grooves in a radial direction. The track pitch is limited by thermal crosstalk. This means that the quality of the data recorded in a track will be influenced by recording at the adjacent track. The shape of the recorded marks may then be distorted, which results in a large jitter. The tangential density is determined by the channel bit length, which is limited by the fact that the light absorption of the amorphous state $(A_a)$ is higher than that of the crystalline state $(A_c)$ when a standard IPIM stack is used. In this stack, I represents a dielectric layer, P represents a phase-change recording layer, and M represents a reflective or mirror layer. Therefore, an amorphous portion is heated to a higher temperature than a crystalline portion when the recording film is irradiated with laser light. As a result, the recording marks overwritten in a crystalline area are smaller than those in an amorphous area. Such a phenomenon causes an increase of jitter, which is proportional to the inverse of the channel bit length. To overcome the problem, the difference between $A_c$ and $A_a$ should be minimized, or better $A_c \geq A_a$.

An optical information medium of the type mentioned in the opening paragraph is known from U.S. Pat. No. 5,652,036. The known medium of the phase-change type has a substrate carrying a stack of layers comprising three dielectric layers, a phase-change recording layer, a light-absorbing layer, and a reflective layer. Many permutations of possible stacks are disclosed, e.g. an IAIPIM stack, in which I, P, and M have the above mentioned meaning, and A represents the light-absorbing layer. The light-absorbing layer is formed of a mixture comprising a dielectric material and a metal or semiconductor material. The result of the addition of the light-absorbing layer A is that the difference in light-absorption between the amorphous state $(A_a)$ and the crystalline state $(A_c)$ of the recording layer is minimized, thus reducing the recording mark distortion. A disadvantage of the known recording medium is that it is not suitable for high density land-groove recording. This is caused by the fact that the optical phase difference $(\Psi_c-\Psi_a)$ between the crystalline state and the amorphous state in the known stacks is not close to zero, the necessity of which will be explained later.

SUMMARY OF THE INVENTION

It is an object of the invention to provide, inter alia, a rewritable optical information medium which is suitable for high density land-groove recording, which means that $\Psi_c-\Psi_a$ (in rad) should be substantially zero. The difference between $A_c$ and $A_a$ should be close to zero, or preferably $A_c/A_a > 0.95$, or more preferably $A_c \geq A_a$, while the optical contrast remains high. The optical contrast C is defined as $100(R_c-R_a)/R_c$, in which $R_c$ and $R_a$ are the reflectivity of the crystalline and amorphous states respectively.

These objects are achieved in accordance with the invention by an optical information medium as described in the opening paragraph, the stack of which has the following layer sequence:

a first dielectric layer,
a recording layer of a phase-change material which is able to record amorphous bits when in the crystalline state,
a second dielectric layer,
a light-absorbing layer of a material having a n/k ratio of 0.5 to 20, wherein n is the refractive index and k is the extinction coefficient,
a third dielectric layer, and
a metal mirror layer.

This stack of layers can be referred to as an IPIAIM structure, in which I, P, I, A, and M have the above-mentioned meaning. The presence of the light-absorbing layer of a material with the indicated n/k ratio ensures that the quantity of laser-light absorbed in the recording layer in the crystalline state $(A_c)$ is almost equal to or higher than that absorbed in the amorphous state $(A_a)$. As a result, the recording marks overwritten in a crystalline area have the same size as those in an amorphous area. This effect will reduce jitter; the storage density of such a recording medium can be considerably enhanced.

It is preferred for land-groove recording that the light-absorbing layer is arranged between the phase-change layer and the metal mirror layer and sandwiched between two dielectric layers, because this arrangement ensures that the optical phase difference $\Psi_c-\Psi_a$ (in rad) is substantially zero. The reason for this is that the modulation of a reflected laser-light beam is not only produced by reflection differences between the amorphous marks and the crystalline recording layer, but also by the optical phase differences between the amorphous marks and the crystalline recording layer. In land-groove recording, i.e. recording in the grooves and on the lands between the grooves, the modulation of marks in the grooves and on the lands should be equal, i.e. should only be caused by reflection differences: In an in-groove recording mode or an on-land recording mode, i.e. not a combination of both recording modes, the optical phase difference $\Psi_c-\Psi_a$ does not matter.

The material of the light-absorbing layer has a n/k ratio in the range between 0.5 to 20, preferably 0.6 to 16. These values give a proper balance between light absorption and transmission. Examples of materials which satisfy these conditions are metals selected from the group consisting of Mo, W, Pd, Pt, Co, Ni, Mn, Ta, Cr, Ti and Hf, and semiconducting materials selected from the group consisting of PbS, Ge, InP and Si. Preferred are Si and Ge, because they are cheap and easy to apply. Metals like Au, Cu, Al and Rh do not satisfy this condition, because their n/k value is outside the range.

The thickness of the light-absorbing layer is preferably between 2 and 200 nm, more preferably between 10 and 100 nm, in order to have a proper balance between light absorption and transmission, and depends on the n/k ratio of the material chosen. For example for Si the thickness is about 75 nm, for Mo the thickness is about 35 nm, and for Ge the thickness is about 55 nm.

The recording layer comprises a phase-change material showing a crystalline-amorphous phase transition. Known materials are e.g. alloys of In—Se, In—Se—Sb, In—Sb—Te, Te—Ge, Te—Se—Sb, Te—Ge—Se, or Ag—In—Sb—Te. Preferably, the recording layer comprises a GeSbTe compound. Especially useful are the compounds described in the international patent application WO 97/50084 (PHN 15881) filed by Applicants now U.S. Pat. No. 5,876,822. These compounds have a composition defined in atomic percentages by the formula: $Ge_{50x}Sb_{40-40x}Te_{60-10x}$, wherein $0.166 \leq x \leq 0.444$. These compositions are situated on the line connecting the compounds GeTe and $Sb_2Te_3$ in the triangular Ge—Sb—Te composition diagram, and include the stoichiometric compounds $Ge_2Sb_2Te_5$ (x=0.445), $GeSb_2Te_4$ (x=0.286) and $GeSb_4Te_7$ (x=0. 166). These compounds show a short complete erase time (CET).

Other preferred compounds are described in the nonprepublished European patent application with application number 97203459.9 (PHN 16586) filed by Applicants (copending U.S. application Ser. No. 09/184,529,filed Nov. 2, 1998). These compounds have a composition defined by an area in the ternary composition diagram Ge—Sb—Te in atomic percentages, said area being of pentagonal shape having the following vertices:

$Ge_{14.2}Sb_{25.8}Te_{60.0}$ (P)

$Ge_{12.7}Sb_{27.3}Te_{60.0}$ (Q)

$Ge_{13.4}Sb_{29.3}Te_{57.4}$ (R)

$Ge_{15.1}Sb_{27.8}Te_{57.1}$ (S)

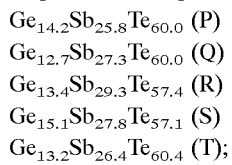
$Ge_{13.2}Sb_{26.4}Te_{60.4}$ (T);

With these compounds CET-values below 50 ns can be achieved.

Other preferred compounds have a composition of the formula:

$(GeSb_2Te_4)_{1-x}Te_x$ wherein the molar fraction x satisfies: $0.01 \leq x \leq 0.37$. These compositions are situated on the tie-line connecting $GeSb_2Te_4$ and Te in the ternary composition diagram, but within the pentagonal area PQRST. With these compounds CET-values lower than 45 ns can be obtained.

When up to 3.5 at % oxygen is added to the abovementioned Ge—Sb—Te compounds, even lower CET-values are obtained.

The crystallization speed or CET-value of the above mentioned GeSbTe compounds depends on the layer thickness of the recording layer. CET decreases rapidly as the layer thickness increases up to 10 nm. When the recording layer is thicker than 25 nm, CET is essentially independent of thickness. Above 35 nm the cyclability of the medium is adversely affected. The cyclability of the medium is measured by the relative change of the optical contrast C after a large number of DOW-cycles, e.g $10^5$. In every cycle the written amorphous marks are erased by recrystallizing through heating with a laser-light beam while the new amorphous marks are written. In the ideal case, the optical contrast C remains unchanged after cycling. The cyclability is practically constant up to a layer thickness of the recording layer of 35 nm. As a result of the combined demands regarding CET and cyclability, the thickness of the recording layer should preferably range between 10 and 35 nm, more preferably between 25 and 35 nm. A medium having a recording layer with a thickness between 25 and 35 nm has a constant low jitter during the first $10^5$ DOW-cycles.

The first, second and third dielectric layers can be made of a mixture of ZnS and $SiO_2$, e.g. $(ZnS)_{80}(SiO_2)_{20}$. The layers may also be made of $SiO_2$, $TiO_2$, ZnS, $Si_3N_4$, AlN and $Ta_2O_5$. Preferably, a carbide is used, like SiC, WC, TaC, ZrC or TiC. These materials give a higher crystallization speed and better cyclability than a ZnS—$SiO_2$ mixture.

For the metal mirror layer, metals such as Al, Ti, Au, Ni, Cu, Ag, Rh, Pt, Pd, Ni, Co, Mn and Cr, and alloys of these metals, can be used. Examples of suitable alloys are AlTi, AlCr and AlTa.

The thickness of the first dielectric layer is preferably between 70 and $[70+\lambda/(2n)]$ nm, wherein ) is the wavelength of the laser-light beam, and n is the refractive index of the dielectric layer. If the thickness is smaller than 70 nm, the cyclability is reduced considerably. A thickness above 70+λ (2n) nm does not lead to a further increase of the cyclability, adversely affects the optical contrast, and is more expensive to make. If for example the wavelength is equal to 630 nm and the refractive index is 1.5, the thickness range extends from 70 nm to 280 nm.

The second dielectric layer prevents interaction (alloying by diffusion) between the light-absorbing layer and the recording layer. It also tunes the absorption ratio between the crystalline and the amorphous phase. The thickness amounts preferably between 2 and 30 nm, more preferably between 5 and 15 nm. A smaller thickness than 2 nm may cause the formation of cracks, and reduces the cyclability. A larger thickness than 30 nm reduces the cooling rate of the recording layer.

The third dielectric layer prevents interaction between the light-absorbing layer and the metal mirror layer. It also tunes the cooling rate of the recording layer, and thus the writing sensitivity. The thickness is preferably between 2 and 100 nm, more preferably between 10 and 50 nm. When the thickness is smaller than 2 nm, the thermal insulation between the recording layer and the metal mirror layer is adversely affected. As a result, the cooling rate of the recording layer is increased, and, consequently, the write power. With a thickness above 50 nm, the cooling rate of the recording layer is too low.

The thickness of the metal mirror layer is preferably between 60 and 160 nm. The cyclability is adversely affected when the metal mirror layer is thinner than 60 nm, because the cooling rate is too low. When the metal mirror layer is 160 nm or thicker, the cyclability deteriorates further, and the recording and erasing power must be high because of the increased thermal conduction. More preferably, the thickness of the metal mirror layer is between 80 and 120 nm.

Both the reflective mirror layer, the light-absorbing layer, and the dielectric layers can be provided by vapour deposition or sputtering.

The phase change recording layer can be applied to the substrate by vacuum deposition, electron beam vacuum deposition, chemical vapour deposition, ion plating or sputtering. The layer as deposited is amorphous and exhibits a low reflection. In order to constitute a suitable recording layer having a high reflection, this layer must first be completely crystallized, which is commonly referred to as initialization. For this purpose, the recording layer can be heated in a furnace to a temperature above the crystallization temperature of the GeSbTe compound, e.g. 180° C. When a synthetic resin substrate is used, such as polycarbonate, the recording layer can alternatively be heated by a laser-light beam of sufficient power. This can be realized, e.g. in a recorder, in which case the laser-light beam scans the moving recording layer. The amorphous layer is then locally heated to the temperature required for crystallizing the layer, without the substrate being subjected to a disadvantageous heat load.

The substrate of the information medium is at least transparent to the laser wavelength, and is made, for example, of polycarbonate, polymethyl methacrylate (PMMA), amorphous polyolefin or glass. In a typical example, the substrate is disc-shaped and has a diameter of 120 mm and a thickness of 0.1, 0.6 or 1.2 mm. When a substrate of 0.6 or 1.2 mm is used, the layers can be applied on this substrate starting with the first dielectric layer, recording layer, etc. The laser-light beam enters the stack via the entrance face of the substrate. The layers of the stack on the substrate may also be applied in the reversed order, i.e. starting with the metal mirror layer. The last dielectric layer is then provided with a transparent layer of one of the above mentioned substrate materials with a thickness of 0.1 mm. The laser-light beam enters the stack via the entrance face of this transparent layer.

In order to carry out land-groove recording, the recording medium should be provided with concentric or spiral tracking guide grooves. This groove can be scanned optically with the laser-light beam. The groove can be formed in the substrate by means of a mould during injection moulding or pressing. The groove can be alternatively formed in a replication process in a synthetic resin layer, for example, a UV light-cured layer of acrylate, which is separately provided on the substrate. In high-density recording such a groove has a pitch e.g. of 0.6–1.2 $\mu$m and a width of about half the pitch.

Optionally, the outermost layer of the stack is screened from the environment by means of a protective layer of, for example, UV light-cured poly(meth)acrylate.

High-density recording and erasing can be achieved by using a short-wavelength laser, e.g. with a wavelength of 670 nm or shorter (red to blue).

BRIEF DESCRIPTION OF THE DRAWING

In the drawing the sole FIGURE is the shows a schematic cross-sectional view of an optical information medium in accordance with the invention with a stack having an IPIAIM structure.

DETAILED DESCRIPTION OF THE INVENTION

The invention will now be described in greater detail with reference to the figures of the drawing and the following examples.

Exemplary embodiment 1.

The sole FIGURE of the drawing schematically shows a part of a cross-section of an optical information disc in accordance with the invention. Reference numeral 1 denotes a polycarbonate disc-shaped substrate having a diameter of 120 mm and a thickness of 0.6 mm. The substrate 1 is provided with an IPIAIM stack 2 of the following structure:

a first dielectric layer 3 of $(ZnS)_{80}(SiO_2)_{20}$ with a thickness of 81 nm, a recording layer 4 of the phase-change compound $GeSb_2Te_4$ (in atomic percentages $Ge_{14.3}Sb_{28.6}Te_{57.1}$) with a thickness of 20 nm, a second dielectric layer 5 of $(ZnS)_{80}(SiO_2)_{20}$ with a thickness of 5 nm, a light-absorbing layer 6 of Si (n/k=15.2) with a thickness of 75 nm, a third dielectric layer 7 of $(ZnS)_{80}(SiO_2)_{20}$ with a thickness of 20 nm, a metal mirror layer 8 of Al with a thickness of 100 nm, The stack 2 is covered with a protective coating 9 of UV-cured polyacrylate.

All the layers, except the protective coating, are provided by sputtering.

The initial crystalline state of the recording layer 4 is obtained by heating the as-deposited amorphous alloy with a focused laser beam in a recorder.

The substrate 1 is provided on one side with a spiral tracking guide groove by means of TV-light curing a layer of acrylate in a replication process. In this way grooves 10 and lands 11 are formed. The grooves have a pitch of 0.8 $\mu$m and a width of about half the pitch.

A laser-light beam 12 with a wavelength of 670 nm for recording, reproducing and erasing of information enters the stack 2 via a converging lens 13 and the substrate 1. The amorphous marks are written with one or more laser pulses of power $P_w=1.25\ P_m$ ($P_m$=melting threshold power) and duration of 100 ns. The erase power is $P_w/2$. Recording can be carried out in the grooves 10 (in-groove recording), on the lands 11 (on-land recording), or both in the grooves and on the lands between the grooves (land-groove recording).

In the Table below the results are summarized as Example 1. The third column gives the optical contrast C, which is defined above. The results show that the difference in light absorption between the amorphous state ($A_a$) and the crystalline state ($A_c$) is minimal. This reduces the difference in temperature rise during DOW, thereby obtaining a minimal distortion of recorded marks, resulting in improved erasing and jitter characteristics. This is especially useful when the recording medium is used for high density recording. The optical phase difference $\Psi_c-\Psi_a$ is almost zero, so that the modulations caused by recorded marks in land and groove will be equal. Therefore, the recording medium according to the invention is suitable for land-groove recording.

TABLE

| Example | A material | C (%) | $A_a$ (%) | $A_c$ (%) | $A_c/A_a$ | $\Psi_c-\Psi_a$ (rad) |
|---|---|---|---|---|---|---|
| 1 | Si | 89.5 | 76.40 | 74.85 | 0.980 | −0.006 |
| 2 | Ge | 85.6 | 69.50 | 69.85 | 1.005 | −0.003 |
| 3 | Mo | 85.0 | 67.60 | 68.78 | 1.018 | −0.091 |
| 4 | — | 88.6 | 91.28 | 78.02 | 0.855 | −0.228 |
| 5 | Au | 91.8 | 96.28 | 80.19 | 0.833 | −0.052 |
| 6 | Si | 81.4 | 87.54 | 77.57 | 0.886 | −0.636 |
| 7 | Ge | 78.4 | 83.82 | 75.94 | 0.906 | −0.706 |
| 8 | Mo | 81.3 | 76.16 | 68.97 | 0.906 | −0.479 |
| 9 | Au | 88.3 | 89.95 | 76.63 | 0.852 | −0.061 |

Exemplary embodiment 2.

Exemplary embodiment 1 is repeated, using Ge (n/k=6.5) as the material for the light-absorptive layer 6 with a thickness of 55 nm. The first dielectric layer has a thickness of 75 m. The results are given as Example 2 in the Table. The difference between $A_c$ and $A_a$ is almost zero; $A_c$ is even larger than $A_a$. $\Psi_c-\Psi_a$ is almost zero. Exemplary embodiment 3.

Exemplary embodiment 1 is repeated, using Mo (n/k=1.0) as the material for light-absorbing layer 6 with a thickness of 35 nm. The first dielectric layer has a thickness of 220 nm. The results are given as Example 3 in the Table. The difference between $A_c$ and $A_a$ is almost zero; $A_c$ is even larger than $A_a$. $\Psi_c-\Psi_a$ is almost zero.

Examples 1 to 3 are according to the invention. All the Examples show a good contrast C. The following examples 4 to 9 are not according to the invention.

Exemplary embodiment 4 (not according to the invention).

Exemplary embodiment 1 is repeated, in which the light-absorbing layer and the third dielectric layer are omitted. As a result, the stack obtained has the structure IPIM. The results are given as Example 4 in the Table. $A_a$ is larger than $A_c$ which gives a difference in temperature rise during DOW and therefore a distortion of recorded marks, resulting in less favourable erasing and jitter characteristics. Therefore, this recording medium is less useful for high density recording. The optical phase difference $\Psi_c-\Psi_a$ is relatively large, so that the modulations caused by recorded marks in land and groove are not equal. Therefore, this recording medium is not very suitable for land-groove recording.

Exemplary embodiment 5 (not according to the invention).

Exemplary embodiment 1 is repeated, using Au (n/k=0.03) as the material for the light-absorbing layer 6 with a thickness of 35 nm. The first dielectric layer has a thickness of 100 nm. The results are given as Example 5 in the Table. $A_a$ is larger than $A_c$, which gives a difference in temperature rise during DOW and therefore a distortion of recorded marks, resulting in less favourable erasing and jitter characteristics. Therefore, this recording medium is less useful for high density recording.

Exemplary embodiments 6 to 9 (not according to the invention).

Exemplary embodiment 1 is repeated, but the light-absorbing Si layer is arranged between the first dielectric layer and the phase-change layer. The resulting stack has the structure IAIPIM. The thickness of the light-absorptive layer is 5 nm. The thicknesses of the first, second and third dielectric layer are 100 nm, 5 nm, and 25 nm respectively. The first dielectric layer has a thickness of 100 nm. The results are given as Example 6 in the Table.

Exemplary embodiment 6 is repeated, using Ge as the material for the light-absorbing layer with a thickness of 3 nm. The thickness of the first dielectric layer is 99 nm. The results are given as Example 7 in the Table.

Exemplary embodiment 6 is repeated, using Mo as the material for the light-absorbing layer with a thickness of 2 nm. The thickness of the first dielectric layer is 84 nm. The results are given as Example 8 in the Table.

Exemplary embodiment 6 is repeated, using Au as the material for the light-absorbing layer with a thickness of 5 nm. The thickness of the first dielectric layer is 70 nm. The results are given as Example 9 in the Table.

The Examples 6 to 9, all having stacks with an IAIPIM structure, have values of $A_a$ which are larger than $A_c$. This effect gives a difference in temperature rise during DOW and therefore a distortion of recorded marks, resulting in less favourable erasing and jitter characteristics. Therefore, such recording media are less useful for high density recording.

Moreover, the Examples 6 to 8 each show an optical phase difference $\Psi_c-\Psi_a$ which is relatively large, so that the modulations caused by recorded marks in land and groove are not equal. Therefore, these recording media are not very suitable for land-groove recording.

According to the invention a rewritable phase change optical information medium with an IPIAIM stack is provided, such as for DVD-RAM, DVD-ReWritable, or DVR, which is suitable for DOW and high density recording, and moreover for land-groove recording.

What is claimed is:

1. An optical information medium for rewritable recording by means of a laser-light beam, said medium comprising a substrate carrying a stack of layers, which stack comprises in this order:

a first dielectric layer, a recording layer of a phase-change material which is able to record amorphous bits when in the crystalline state, a second dielectric layer, a light-absorbing layer of a material having a n/k ratio of 0.5 to 20, wherein n is the refractive index and k is the extinction coefficient, a third dielectric layer, and a metal mirror layer.

2. An optical information medium as claimed in claim 1, characterized in that the light-absorbing layer comprises a metal selected from the group consisting of Mo, W, Pd, Pt, Co, Ni, Mn, Ta, Cr, Ti and Hf, or a semiconducting material selected from the group consisting of PbS, Ge, InP and Si.

3. An optical information medium as claimed in claim 1, characterized in that the light-absorbing layer has a thickness between 2 and 200 nm.

4. An optical information medium as claimed in claim 1, characterized in that the recording layer comprises a GeSbTe compound.

5. An optical information medium as claimed in claim 1, characterized in that the recording layer has a thickness from 10 to 35 nm, preferably from 25 to 35 nm.

6. An optical information medium as claimed in claim 1, characterized in that the thickness of the first dielectric layer is between 70 and $[70+\lambda/(2n)]$ nm, wherein $\lambda$ is the wavelength of the laser-light beam, and n is the refractive index of the dielectric layer.

7. An optical information medium as claimed in claim 1, characterized in that the thickness of the second dielectric layer is between 2 and 30 nm.

8. An optical information medium as claimed in claim 1, characterized in that the thickness of the third dielectric layer is between 2 and 100 nm.

9. An optical information medium as claimed in claim 1, characterized in that the thickness of the metal mirror layer is between 60 and 160 nm.

10. Use of an optical information medium as claimed in claim 1 for land-groove recording.

* * * * *